US012655926B2

(12) United States Patent
Odori

(10) Patent No.: US 12,655,926 B2
(45) Date of Patent: Jun. 16, 2026

(54) DEVICE FOR THE REMOVABLE LOCKING OF A PLUG TO A PIPELINE FITTING

(71) Applicant: I.S.I.F. S.R.L., Castelfranco Piandisco (IT)

(72) Inventor: Mauro Odori, Castelfranco Piandisco (IT)

(73) Assignee: I.S.I.F. S.R.L., Castelfranco Piandisco (IT)

( * ) Notice: Subject to any disclaimer, the term of this patent is extended or adjusted under 35 U.S.C. 154(b) by 413 days.

(21) Appl. No.: 18/264,513

(22) PCT Filed: Feb. 8, 2021

(86) PCT No.: PCT/IB2021/050998
§ 371 (c)(1),
(2) Date: Aug. 7, 2023

(87) PCT Pub. No.: WO2022/167843
PCT Pub. Date: Aug. 11, 2022

(65) Prior Publication Data
US 2024/0044436 A1     Feb. 8, 2024

(51) Int. Cl.
*F16L 55/136*          (2006.01)
*F16L 55/11*           (2006.01)

(52) U.S. Cl.
CPC ............. *F16L 55/136* (2013.01); *F16L 55/11* (2013.01)

(58) Field of Classification Search
CPC ....... F16L 55/11; F16L 55/136; F16L 55/128; F16L 55/1157; F16L 55/12; F16L 47/285; F16L 41/16; F16L 29/00; F16L 29/007; F16L 37/28; F16L 37/38; F16L 37/44;
(Continued)

(56) References Cited

U.S. PATENT DOCUMENTS

| | | | |
|---|---|---|---|
| 4,609,209 A | 9/1986 | Ralls | |
| 4,693,278 A * | 9/1987 | Wilson | F16L 55/136 |
| | | | 220/203.27 |

FOREIGN PATENT DOCUMENTS

| | | |
|---|---|---|
| FR | 1 332 163 A | 12/1963 |
| KR | 2009 0012817 U | 12/2009 |
| KR | 2017 0141868 A | 12/2017 |

OTHER PUBLICATIONS

International Search Report, Application PCT/IB2021/050998, mailed Oct. 26, 2021, 3 pages.

(Continued)

*Primary Examiner* — Aaron M Dunwoody
(74) *Attorney, Agent, or Firm* — Francis J. Maguire; WARE FRESSOLA MAGUIRE & BARBER LLP

(57) ABSTRACT

The device (1) allows the locking of a plug (2) to a fitting (3) and comprises: two locking blades (10), having the outer edge (10B) in an arc of circumference, arranged symmetrically opposite and coplanar to a annular groove (31) of the plug (2), sliding parallel to the latter; actuation means (4) defined by a toothed pinion (13) with which two racks (120) provided in the locking blades (10) are engaged, determining for the same corresponding and synchronized translations in opposite directions, so that the arched edges (10B) are displaced outwards to engage said annular groove (31), locking the plug (2) to the fitting (3). The toothed pinion (13) has a hexagonal head (130) at the top which is engaged by an operating member (15).

10 Claims, 3 Drawing Sheets

(58) Field of Classification Search
CPC ...... F16K 35/02; F16K 35/022; F16K 35/025;
F16K 35/10; F16K 35/06
See application file for complete search history.

(56) References Cited

OTHER PUBLICATIONS

Written Opinion of the International Searching Authority, Application PCT/IB2021/050998, mailed Oct. 26, 2021, 8 pages.

* cited by examiner

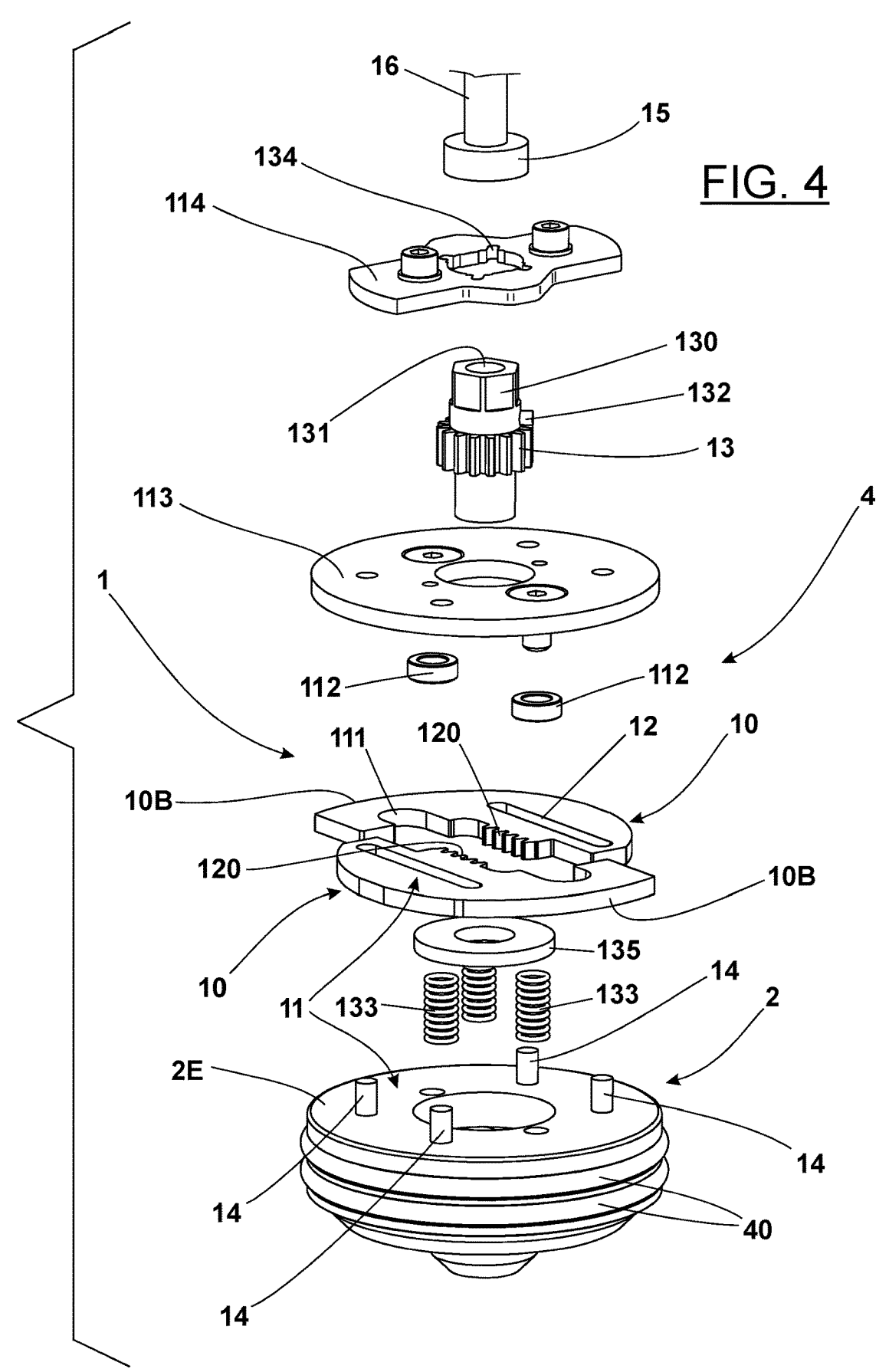
_FIG. 4_

DEVICE FOR THE REMOVABLE LOCKING OF A PLUG TO A PIPELINE FITTING

TECHNICAL FIELD

The invention is part of the technical sector concerning land pipelines for the transport of fluids or gases, for example aqueducts, oil pipelines, gas pipelines and the like.

These pipes, which can be of any type, for example underground or above ground, and often extend for many kilometers, sometimes thousands.

BACKGROUND ART

In the event of maintenance, repairs, removal of occlusions and more, fittings must be installed, usually one upstream and one downstream of the section concerned, which allow to isolate the latter and, at the same time, create a by-pass that maintains the continuity of the transit of the fluid or gas transported along the pipeline.

The aforesaid fittings, according to the known technique, consist of a branch pipe which is welded perpendicularly to the duct, then suitably perforated.

In correspondence with the access mouth of the fitting, which is located laterally to the duct, there is usually a sturdy flange to which the by-pass pipe and/or tools for machining and/or devices can be fixed to close the section of the pipeline under repair to be insulated.

A so-called flat valve is usually associated with the access mouth of the fitting, which opens and closes the deviation towards the by-pass. After maintenance is complete, the flat valve is disassembled, the access mouth of the fitting is closed with a lid fixed to the flange and the normal flow of fluid or gas in the repaired section of the pipeline is then restored.

TECHNICAL PROBLEM

The plug object of the present invention is intended to be housed inside the access mouth and then locked to it, to constitute a sort of temporary closure of the fitting, therefore of the pipeline, in the transient assembly and disassembly of the flat valve.

Said plug, in a per se known manner, is placed in position and removed by means of a suitable device to be fixed above the flat valve, known to those skilled in the art as a positioner.

As it seems intuitive to understand, the plug that is affixed to close the fitting, even if provisional, must have the necessary mechanical strength and a pressure seal sufficient to contain the thrust of the fluid or gas present in the pipeline.

It is therefore necessary to equip the plug with means that allow it to be firmly connected to the fitting, using a groove for this purpose made in said access mouth.

Having to act for said assembly and removal of the plug with the aforementioned positioner mounted, by means of members provided inside it, therefore without a direct view of the maneuvers performed, it is intuitive to understand that the aforementioned coupling means must be easily maneuvered.

In the prior document FR1332163A, a plug is described to be inserted and fixed inside the access mouth to the fitting, in which the aforementioned annular groove is made.

As regards the mechanical retention, the plug described in the aforementioned prior document makes use of two opposing plates in the shape of a semicircle, carried by the main body of the plug with the possibility of translating radially in expansion, by means of a cam mechanism that can be controlled from the outside by a tool, so that their arcuate edges enter said annular groove, blocking the plug, or approaching, to free the aforesaid arcuate edges from the groove and allow the plug to be removed.

The expansion movement is implemented in contrast with the action of elastic members which provide to recall the plates in the opposite approach maneuver.

The drawback complained of with the solution just described derives from the fact that the radius of curvature of the edges of the semicircular plates is substantially the same as that of the access mouth, since in their approached position, the same arched edges are almost aligned with the external circumference of the plug, which must be able to be freely introduced and extracted from the access mouth itself.

The bottom of the annular groove evidently has a greater radius of curvature, therefore the coupling of the arched edges within the groove is not optimal, since when the central zone of the same edges meets the bottom, the end zones are moved away from it, enough to be external to the throat itself.

As an obvious consequence, the mechanical coupling between the plates and the groove is only partial and therefore the overall resistance is limited.

Also known are devices for locking a stopper comprising locking blades oscillating in respective fulcrums, which have the respective outer edge of arcuate shape and intended to be inserted in said annular groove.

The oscillation of the locking blades is controlled, through suitable actuation means, with a maneuvering device incorporated in the positioner to determine the engagement or disengagement of the same with or from the annular groove.

This solution, in some embodiments, may require a non-negligible force to swing the locking blades, being that the operating member often works with an unfavorable lever.

OBJECTS OF THE INVENTION

The object of the present invention is therefore to propose a device for the removable locking of a plug to a fitting of a pipe, according to the known art, whereby the plug is inside the access mouth of the fitting, and an annular groove is used. in the latter to provide the mechanical coupling between the plug and the fitting, said device however being structured in such a way as to increase the contact surfaces with the annular groove with respect to known solutions and therefore capable of offering a higher mechanical resistance.

Another purpose of the invention is to propose a device of simple design, compact and manoeuvrable without great effort.

A further purpose of the invention is to obtain a device that can be operated with a rotational movement, for a limited angular excursion, using a simple tool provided for this purpose in a known type positioner.

SUMMARY OF THE INVENTION

These and other purposes are fully achieved by a device for locking a plug to a fitting of a pipe of the type intended for the transport of fluids or gases under pressure.

The fitting is applicable to the pipeline for maintenance interventions and is provided with an access mouth arranged with an axis transverse to that of the pipeline itself.

In the aforementioned device are provided:

two locking blades, having their outer edge shaped like a
    sector of circumference, arranged symmetrically oppo-
    site and slidingly guided by guide means on a plane
    parallel to the external face of the aforementioned plug
    and coplanar to an annular groove, made in the internal
    cylindrical surface of the aforementioned plug access
    mouth, each of said locking blades having the curvature
    of the respective outer edge with a radius substantially
    equal to that of the bottom of the aforementioned
    annular groove;
actuation means provided to act simultaneously on said
    two locking blades, determining for the same corre-
    sponding and synchronized translations in opposite
    directions, guided by said guide means, said transla-
    tions being such that the respective arched edges are
    simultaneously displaced outwards to determine their
    engagement in said annular groove, thus defining a
    condition of locking the aforementioned plug to the
    fitting, or retracted inwardly to disengage the same
    arched edges from the annular groove and release said
    plug from the fitting.

BRIEF DESCRIPTION OF THE DRAWINGS

The characteristics of the invention will become evident
from the following description of preferred embodiments of
a device for locking a plug to a fitting of a pipe of the subject
matter, in accordance with what is proposed in the claims
and with the aid of the attached tables of drawing, in which:

FIG. 4 illustrates the device in an exploded axonometric
view.

DESCRIPTION OF PREFERRED
EMBODIMENTS OF THE INVENTION

In the figures listed above, reference 1 indicates the device
object of the present invention, as a whole.

Figure 2:
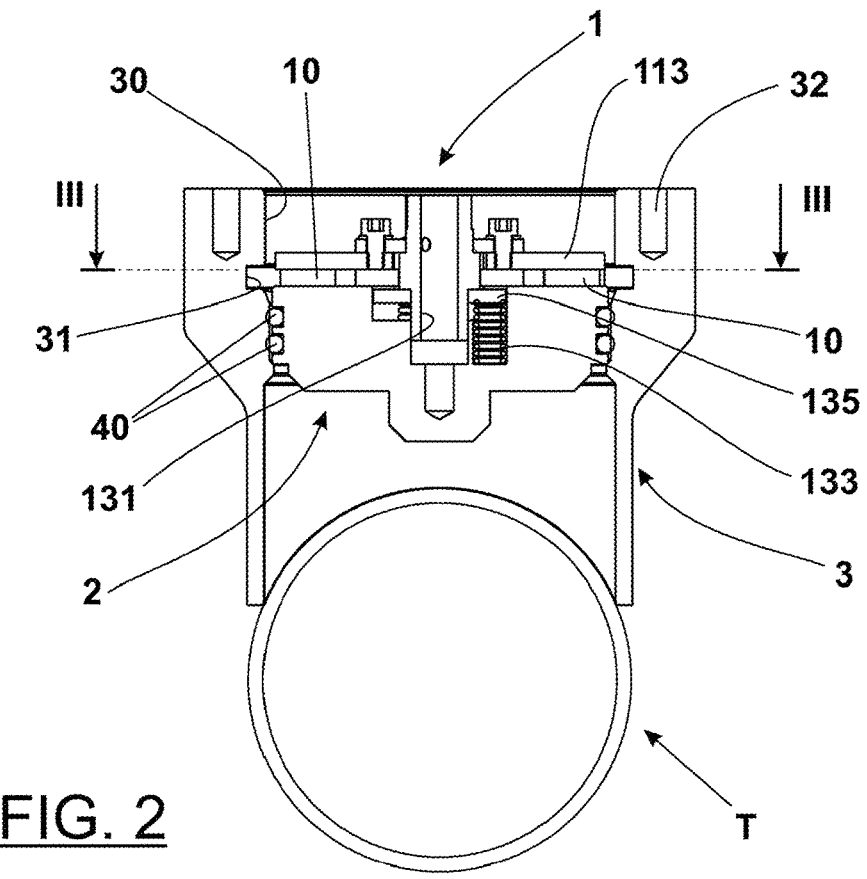
FIG. 2 shows an axial section of the fitting, the plug and
the device, according to the Il-Il plane of FIG. 1.

The device 1 is associated with a plug 2 intended to be
affixed to a fitting 3, which is applied for maintenance
interventions to a pipe T of the type intended for the
transport of fluids or gases under pressure, so that its access
mouth 30 is located laterally to the pipe T, with an axis
substantially perpendicular to this, as mentioned in the
introduction (FIG. 2).

In particular, the plug 2 has an approximately cylindrical
shape, with a circular section and a section no greater than
that of the aforementioned access mouth 30. The plug 2,
according to known technique, is inserted inside the access
mouth 30 of the fitting 3, and the device 1 allows it to be
locked after its introduction, or frees it from its engagement
to allow its removal.

As described in the introduction, the plug 2 constitutes a
closure of the fitting 3 which is temporary in some situa-
tions, and at the same time auxiliary to a lid or closing flange
(not shown), to be fixed to the fitting 3 when said mainte-
nance interventions on the pipe T are finished.

To this end, the fitting 3 is provided with a series of
threaded holes 32, arranged in a crown around the access
mouth 30; a suitable sealing gasket, not shown, is usually
interposed between the fitting 3 and said closing cover.

According to the invention, the device 1 comprises two
locking blades 10, having their outer edge 10B shaped like
a sector of circumference, arranged symmetrically opposite
and slidingly guided by guide means 11 on a plane parallel
to the outer face 2E of the aforementioned plug 2 and
coplanar with an annular groove 31, made in the internal
cylindrical surface of the aforementioned access mouth 30.

The radius of curvature of the outer edge 10B is substan-
tially equal to that of the bottom of the aforementioned
annular groove 31, and extends for an arc with an angular
development of at least 45°.

The invention comprises actuation means 4 provided to
act simultaneously on said two locking blades 10, determin-
ing for the same corresponding and synchronized transla-
tions in opposite directions, guided by the respective guide
means 11.

Figures 3A, 3B:
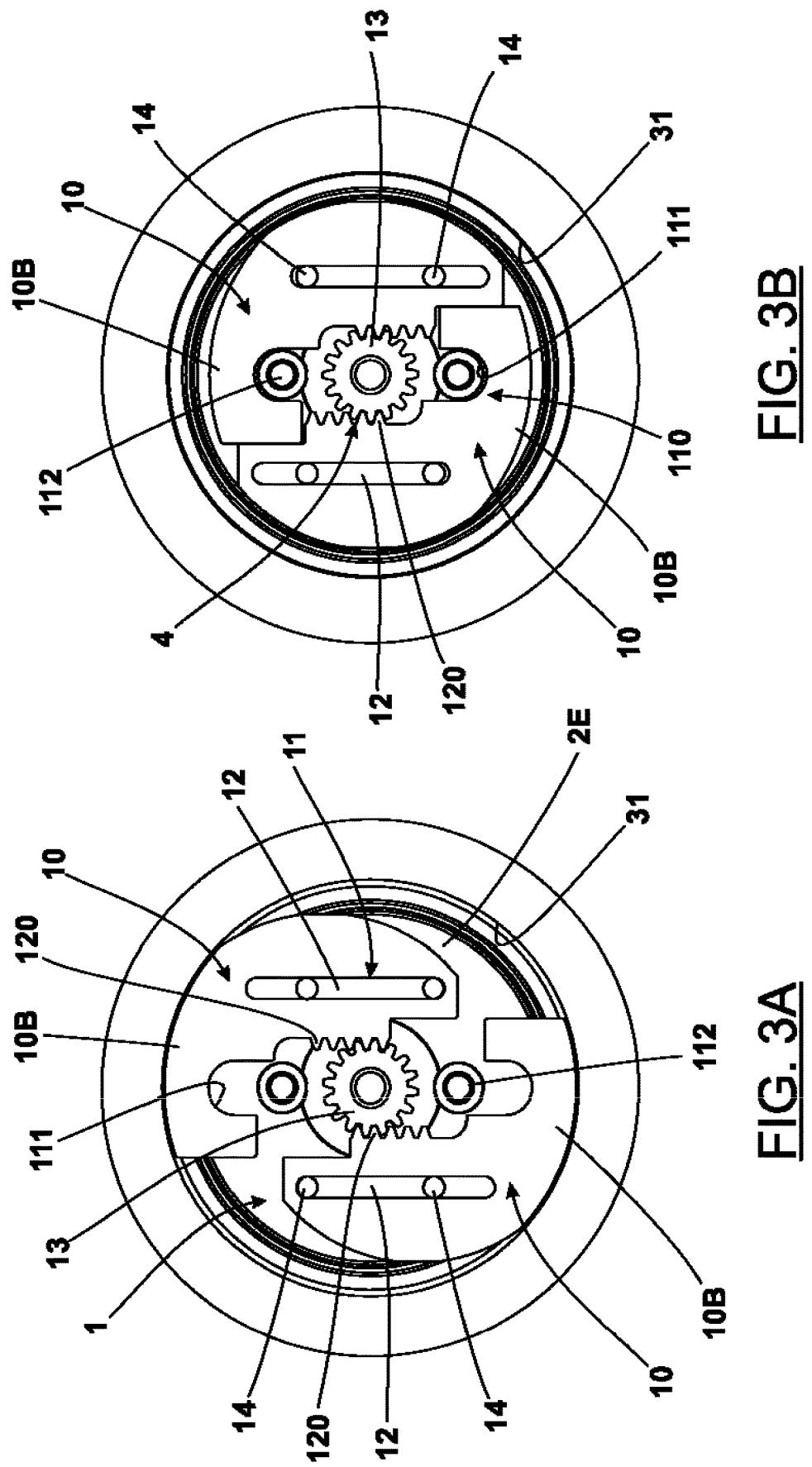
FIG. 3A shows a section on the plane III-III of FIG. 2,
which shows the elements of the device in a position suitable
for locking the plug to the fitting.
FIG. 3B shows a view similar to FIG. 3A, showing the
elements of the device in the position in which the plug is
free from the fitting.

The aforesaid translations are directed so that the arcuate
edges 10B of the locking blades 10 are simultaneously
displaced outwards to determine their engagement in the
annular groove 31 (FIG. 3A), thus defining a locking con-
dition of the plug 2 to connector 3 or, on the contrary,
retracted inwards to disengage the same arched edges 10B
from the same annular groove 31 and release the plug 2 from
the connector 3 (FIG. 3B).

In the aforementioned locking condition of the plug 2, the
arcuate edges 10B of the locking blades 10 are advanta-
geously arranged almost concentric with the aforementioned
annular groove 31 of the fitting 3, so that the depth with
which the arcuate edges 10B engage the annular groove 31
is constant throughout their development and therefore the
mechanical grip is at its maximum effectiveness (see again
FIG. 3A).

To increase the depth of the annular groove 31 and
therefore the mechanical grip between it and the locking
blades 10, it is possible to provide a modest increase in the
diameter of the circumference along which said threaded
holes 32 are arranged; this expedient is also advantageous
for the purpose of increasing the space between the same
holes 32 and the access mouth, so that the relative sealing
gasket is increased in those areas and therefore more resis-
tant to pressure coming from the inside.

Since the threaded holes 32 are provided for fixing to the
fitting 3 a closing flange, not shown, which provides corre-
sponding through holes suitable for receiving respective
bolts, the movement of the same threaded holes 32 must
correspond to an equal outward movement through holes in
the flange. Since these can be very close to the external edge
of the flange itself, it may be convenient to make in the latter,
instead of holes, as many slots open towards the outside,
which in any case guarantee excellent locking of the flange.

In the preferred embodiment illustrated, the guide means
11 consist, in each of said two locking blades 10, of at least
one rectilinear guide slot 12, in which at least two respective
pins 14 protruding from the outer face 2E of the plug 2
(FIGS. 3A, 3B, 4).

In a variant embodiment not shown, each guide slot 12
has a circular arc profile with a large radius, and carries the
aforementioned at least two pegs 14 engaged, in a manner
quite similar to the solution with the guide slits 12 straight.

The guide means 11 advantageously provides auxiliary
members 110 suitable for stabilizing the aforementioned
retracted position of each of the two locking blades 10,
consisting of a semicircular loop 111, made in the latter, intended to engage in a corresponding fixed abutment 112, for example a roller, protruding at the bottom from a disk 113 arranged above the locking blades 10 or associated with the underlying external face 2E of the plug 2.

The actuation means 4 preferably consist of a toothed pinion 13, rotatably supported by the aforementioned plug 2 in a coaxial position to it, with which two racks 120 provided in the corresponding two locking blades 10 are simultaneously engaged in gear, in diametrically opposite positions.

The toothed pinion 13 is intended to be rotated in one direction or the other by a control member 130 coaxial and integral with the same toothed pinion 13, to determine, by means of the said racks 120, the aforementioned synchronized translations according to opposite directions of the locking blades 10, and the consequent displacements of their arcuate edges 10B, respectively towards the outside to insert the latter into the annular groove 31, or towards the inside to disengage them from the annular groove 31.

In accordance with what has just been said, in the presence of said at least one guide slot 12 with rectilinear development, also the corresponding rack 120 has a rectilinear development parallel to that of the guide slot 12, and consequently the aforementioned synchronized translations of the locking blades 10 have straight directions.

In the aforementioned variant embodiment in which each guide slot 12 has an arc-shaped profile, the corresponding rack 120 also has an arc-shaped profile, concentric to that of the respective guide slot 12, so that the aforementioned synchronized translations of the locking blades 10 have curvilinear directions.

In the illustrated embodiment, said control member 130 is defined by a hexagonal head protruding above the toothed pinion 13 and having a smaller diameter than the latter.

Figure 1:
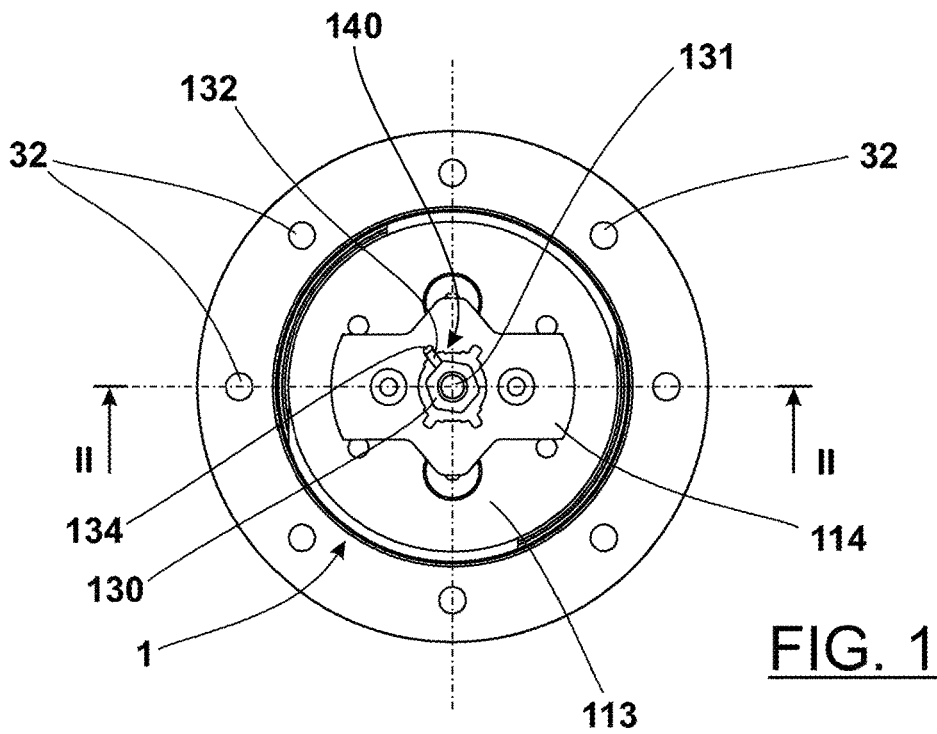
FIG. 1 shows a top plan view of a fitting with a plug fitted
with a preferred embodiment of the device in question.

According to the invention, the locking device 1 further comprises an anti-rotation device 140 (FIGS. 1 and 4), intended to selectively prevent the rotation of the actuation means 4.

In particular, the anti-rotation device 140 comprises a rotation locking member 132, which in the example illustrated in the aforementioned figures consists of a pin, which protrudes radially from the control member 130. The pin 132 is intended to engage a niche 134 made in a fixed plate 114, located above the aforementioned toothed pinion 13 (FIG. 1), due to the thrust action determined by elastic members 133, arranged below the toothed pinion 13 itself, with the interposition of an annular disc 135 (see FIGS. 2 and 4).

The rotation locking member 132 is provided to automatically lock the drive means 4 when they are stationary and inactive.

The control member 130 is designed to be removably engaged by a control member 15 (FIG. 4), operated by an operator, with which a downward thrust is initially exerted on the same control member 130 and the attached pinion. toothed 13, which in any case remains in contact with the racks 120, overcoming the action of the elastic members 133, thereby releasing the radial pin 132 from the recess 134 and releasing the actuation means 4.

By maintaining the downward thrust, an appropriate rotation is imparted to the toothed pinion 13, to act simultaneously on said two locking blades 10, determining for them the aforementioned corresponding and synchronized translations in opposite directions, guided by said guide means 11.

With said translations of the two locking blades 10, the respective arcuate edges 10B are simultaneously displaced towards the outside to determine their engagement in said annular groove 31, thus defining a locking condition of the aforementioned plug 2 to the fitting 3, or retracted inwardly to disengage the same arcuate edges 10B from the same annular groove 31 and release said plug 2 from fitting 3.

At the end of the rotation maneuver of the toothed pinion 13, and with the cessation of the downward thrust, the action of the elastic members 133 makes the same toothed pinion 13 rise together with the control member 130 bringing the radial pin 132 back to engage the niche 134 again, blocking the actuation means 4.

The control member 130 is designed to be removably engaged by a maneuvering member 15 (FIG. 4), operated by an operator, as better specified below, thus causing the toothed pinion 13 to rotate, thereby inducing the said translations of the locking blades 10.

According to a known technique, the aforementioned control member 15, mentioned above, is comprised in a so-called positioner (not shown) to be mounted on the fitting 3 during the assembly and disassembly operations of a flat valve, known to the experts in the field and also not illustrated.

The positioner also comprises means (for example a threaded central bar) to hook the center of the aforementioned plug 2 and to place/remove the same in/from said fitting 3, acting from the outside.

The operating member 15, which, following the assembly of the positioner, is located inside the access mouth 30 of the fitting 3, is constituted, in accordance with the conformation of the control member 130 with a hexagonal head, of a socket wrench with hexagon socket (not shown in detail as it is intuitive to understand), integral with the end of a control rod 16, partially visible in FIG. 4, extended up to the outside of the positioner, with which to rotate said toothed pinion 13.

The control stem 16 is suitably drilled in the center to allow the passage of said threaded bar (not shown) to be coupled with a central hole 131 in the hexagonal head 130.

Above said disk 113 is advantageously provided a fixed plate 114 suitably shaped (FIGS. 1 and 4), able to constitute a stop in the step of introduction of the aforementioned positioner as well as an anti-rotation contrast in the actuation step of the operating member 15.

The plug 2, according to the known technique, is equipped with suitable ring seals 40, suitable for adhering to the access mouth 30, visible in FIGS. 2 and 4.

From what has been described above, the peculiar characteristics of the proposed locking device, intended for the plugs to be positioned and locked inside the access mouth of the fitting, are evident, using for this purpose an annular groove provided in the latter to make the coupling mechanical between plug and fitting.

The device is advantageously shaped in such a way as to optimize the mechanical resistance of the locking, thus overcoming the limits of the solutions of the known technique.

From the attached figures it can be seen that the constructive solution that characterizes the device in question, in all the constructive variants proposed, is of simple design, compact and can be operated quickly.

A further advantageous aspect of the invention resides in the ease and speed of maneuvering of the device, which consists in a rotation of limited excursion both of the toothed pinion and, consequently, of the tool to be used, which, moreover, is advantageously located at the center of said known positioning unit.

It should be noted that the force required to rotate the toothed pinion is limited, making the movement of the locking blades easier than with other operating mechanisms.

However, it is understood that what has been described above has an exemplary and non-limiting value, therefore any detailed variations that may be necessary for technical and/or functional reasons, are considered from now on to fall within the same protective scope defined by the following claims.

The invention claimed is:

1. A device (1), comprising a plug (2) and a fitting (3) for removable locking together, said fitting (3) applicable for maintenance interventions to a pipe (T) for transport of fluid or gas under pressure and provided with an access mouth (30) arranged with an axis transverse to an axis of the pipe (T); said plug (2) having a substantially cylindrical conformation and a section not greater than that of said access mouth (30); said device (1) further comprising:

two locking blades (10), each having an outer edge (10B) shaped as a sector of circumference, arranged symmetrically opposite and slidingly guided by guide means (11) on a plane parallel to an external face (2E) of the plug (2) and coplanar to an annular groove (31) made in an internal cylindrical surface of the access mouth (30), each outer edge (10B) of said locking blades (10) having a curvature with a substantially equal radius to a radius of a bottom of the annular groove (31);

actuation means (4) provided to act simultaneously on said two locking blades (10), for causing corresponding and synchronized translations in opposite directions, guided by said guide means (11), such that each outer edge (10B) is simultaneously displaced outwards to engage in said annular groove (31) so as to lock the plug (2) to the connector (3), the actuation means (4) provided to act to simultaneously displace said two locking blades (10) to retract inwards to disengage the outer edges (10B) from the annular groove (31) and release said plug (2) from the fitting (3), wherein said actuation means (4) comprise: a rotatable toothed pinion (13), supported by the plug (2); a rack (120), provided with rack gears in each of said two locking blades (10) so as to engage with and on opposite sides of the toothed pinion (13), the rotatable toothed pinion (13) drivable in rotation in locking and unlocking directions by a control member (130) coaxial and integral with said toothed pinion (13) so that rotation of the toothed pinion causes the racks (120) to simultaneously displace said locking blades (10) in opposite directions within the access mouth (30), so that consequent displacements of outer edges (10B), for respective insertion into said annular groove (31), or disengagement from the annular groove (31).

2. The device according to claim 1, wherein said guide means (11) consist, in each of said two locking blades (10), of at least one rectilinear guide slot (12) in which at least two respective pins (14) protruding from the external face (2E) of the plug (2) are engaged, wherein the rack gears of each rack (120) have a rectilinear development parallel to that of a respective at least one guide slot (12) and wherein the locking blades (10) simultaneously displace with rectilinear displacements.

3. The device according claim 1, wherein said guide means (11) consist, in each of said two locking blades (10), of at least one arc-shaped guide slot (12) in the which at least two respective pegs (14) projecting from the external face (2E) of the plug (2) are engaged, wherein the rack gears of each rack (120) in turn has an arc profile concentric to a respective at least one guide slot (12), and said locking blades (10) simultaneously displace with curvilinear displacements.

4. The device according to claim 1, wherein said control member (130) is defined by a hexagonal head protruding from the toothed pinion (13), having a smaller diameter than the toothed pinion (13).

5. Positioner for association with said fitting (3) of claim 4, provided with means for hooking the plug (2) and for placing/removing the plug in/from said fitting (3), with said positioner acting on the device (1) and comprising an operating member (15) inside and a control stem (16) extended outside the positioner, said operating member (15) comprising a hexagonal bush configured to fit inside said access mouth (30) of the fitting (3), until it abuts a fixed plate (114) of said plug (2), to engage with said hexagonal head (130) integral to the toothed pinion (13), to rotate the toothed pinion in one direction or another opposite direction.

6. The device according to claim 1, further comprising auxiliary members (110) formed for stabilizing each of the two locking blades (10) when displaced to retract inwards to disengage the outer edges (10B) from the annular groove (31), the auxiliary members (110) consisting of a semicircular loop (111), made in each of the two locking blades (10) for engaging in a corresponding fixed abutment (112) protruding from said external face (2E) of the plug (2).

7. The device according to claim 1, further comprising:

a rotation locking member (132), protruding from said control member (130); a niche (134), made in a fixed plate (114) located above said toothed pinion (13); elastic members (133), arranged below the toothed pinion (13), with the interposition of an annular disc (135); said rotation locking member (132) for engaging said niche (134) according to a thrust action determined by the elastic members (133);

said rotation locking member (132) provided to automatically lock said actuation means (4) when inactive, and also pushable downwards, in keeping with said toothed pinion (13) and control (130), to overcome the thrust action of said elastic members (133) to release and allow maneuvering of the actuation means (4), through the control member (130), to act to simultaneously displace said two blades (10) guided by said guide means (11), said translations being such that the respective outer edges (10B) are simultaneously displaced outwards for engagement in said annular groove (31), thus defining a condition of locking the plug (2) to the connector (3), or retracted inwards to achieve the disengagement of the outer edges (10B) from the annular groove (31) and release said plug (2) from the fitting (3).

8. The device according to claim 7, wherein said rotation locking member (132) consists of a radial pin.

9. The device according to claim 7, wherein said control member (130) is defined by a hexagonal head protruding from the toothed pinion (13), having a smaller diameter than the toothed pinion (13).

10. The device according to claim 7, wherein said guide means (11) consist, in each of said two locking blades (10), of at least one guide slit (12) having an arc-shaped profile in which at least two respective pegs (14) projecting from the external face (2E) of the plug (2) are engaged, wherein the corresponding rack (120) in turn has an arc profile concentric to the respective at least one guide slot (12), and wherein said locking blades (10) simultaneously displace with a curvilinear displacement.

* * * * *